June 24, 1930.  G. G. FENHOUSE  1,767,280
CLAMP
Filed July 17, 1926
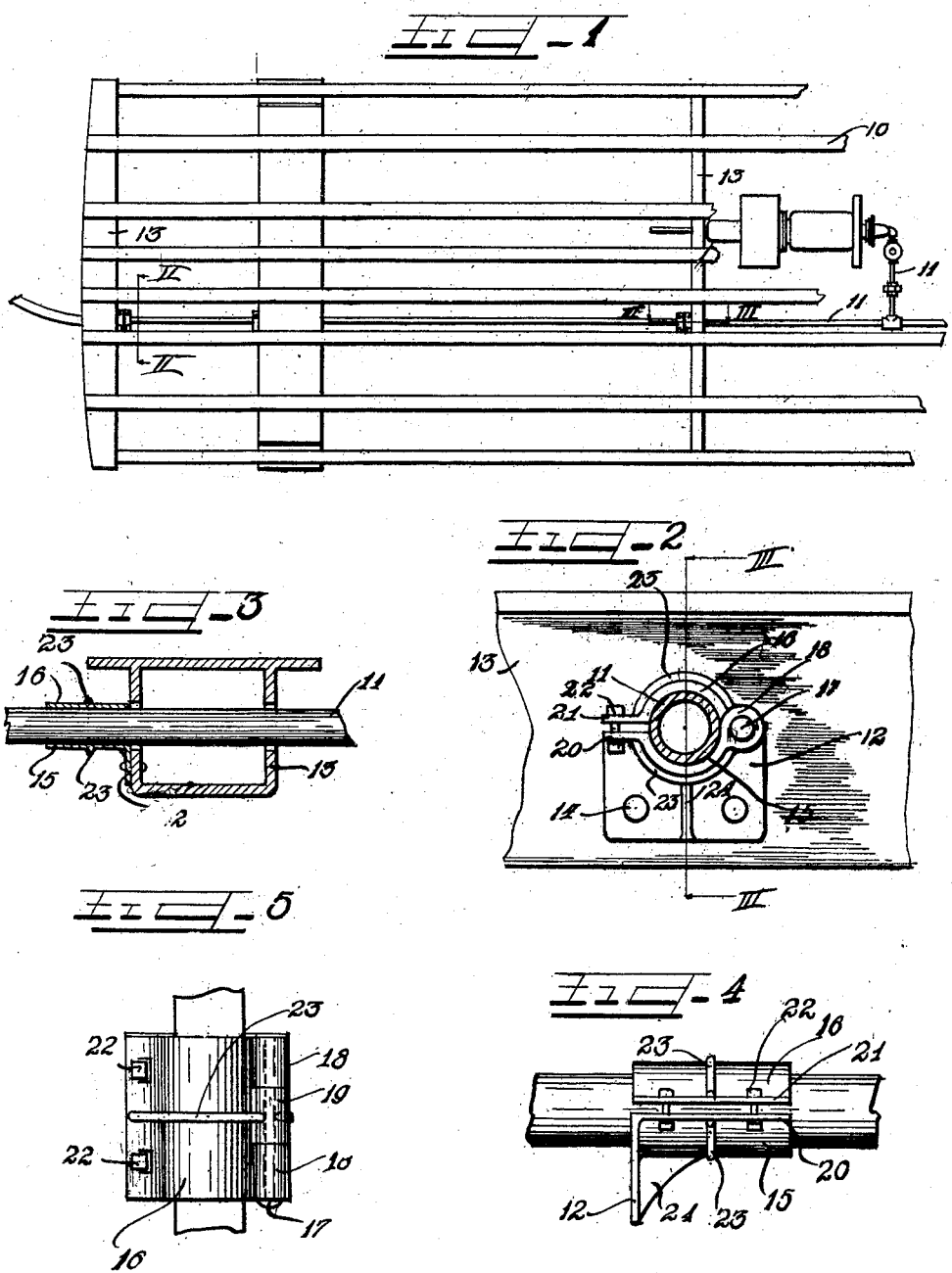
INVENTOR
George G. Fenhouse
BY Charles M. Hills
ATTYS Patented June 24, 1930

1,767,280

UNITED STATES PATENT OFFICE

GEORGE G. FENHOUSE, OF MELROSE PARK, ILLINOIS

CLAMP

Application filed July 17, 1926. Serial No. 123,072.

This invention relates to clamps and more particularly to pipe clamping brackets.

It contemplates more especially the provision of a simple and durable pipe clamp which can be readily secured to a structure for the purpose of supporting pipes or other accessories without subjecting them to the destructive vibratory effects common in moving vehicles.

A frequent source of trouble is experienced especially in the air lines of moving vehicles wherein the coupling between cars must be dependable in order to render the brakes operative. Numerous devices have heretofore been proposed for rigidly supporting pipe lines and the like from the chassis of a vehicle, but these have not proven entirely satisfactory due to their complex construction, lack of rigidity, and inability to withstand the vibrations to which they are subjected.

One object of the present invention is to simplify and improve the construction of devices of the character mentioned.

Another object is to provide an improved clamp which is inexpensive, durable, and capable of withstanding stresses of great magnitude without impairing its clamping action.

Other objects and advantages will appear from the following description of an illustrated embodiment of the present invention.

In the drawings:

Figure 1 is a fragmentary plan view of a vehicle chassis to which clamps embodying features of the present invention, are secured for supporting air lines.

Figure 2 is a sectional view taken substantially along line II—II of Figure 1.

Figure 3 is a sectional view in elevation taken substantially along line III—III of Figures 1 and 2.

Figure 4 is a side view in elevation of a clamp embodying features of the present invention.

Figure 5 is a plan view of the clamp shown in Figure 4.

The clamp selected for illustration is shown applied to a chassis 10 of a vehicle, having air lines 11 for effecting a control of the brakes through the usual coupling (not shown) employed between the cars constituting a train.

In order to rigidly support the pipe lines 11 so as to preclude the possibility of the destruction thereof due to the vibratory impulses to which they are subjected, a clamping bracket comprising a plate 12 secured, in this instance, to the vertical face of a cross-beam 13 by any appropriate fastener such as the rivets 14, is provided. A clamping jaw 15, in this instance of semi-circular cross-section, is formed integral with the plate 12 having the axis thereof disposed normal to the plate, the upper edge of the plate coinciding with the end periphery of the jaw 15. Another clamping jaw 16 also of semi-circular cross-section, is hingedly mounted to the jaw 15 in confronting relation thereto to define a circular gripping face adapted to receive an object therebetween, such as the pipe 11. The complemental jaws are hingedly secured to each other in the usual manner by means of the pin 17 extending through appropriate loops 18 and 19 formed integral with the jaws 15 and 16 respectively.

As shown, the free extremities of the jaws 15 and 16 terminate in radial flanges 20 and 21 which confront each other to receive therethrough appropriate bolts 22 for rigidly maintaining the object between the jaws. It is apparent therefore that the pipe 11 will be supported by the jaws 15 and 16 in such a manner that the pipe may extend through the apertured support 13. It is to be noted that the jaws 15 and 16 extend normally of the plate 12 for a comparatively great distance in order to stabilize the pipe therein which is held fast against the vibrations which set up destructive stresses. To reinforce the structure, a circumferential rib 23 is formed on each of the jaws, transversely of the axis thereof so as to avoid any possible fracture which might otherwise result when the bolts 22 are drawn tight to bring the flanges 20 and 21 together. A web 24 is formed integral with the plate 12 and the jaw 15 to render the structure more rigid and capable of withstanding stresses of great magnitude.

With the arrangement of parts above described, it will be apparent that a simple and durable clamping means has been provided which is capable of rigidly supporting pipe lines and the like which are subjected to destructive vibratory impulses tending to impair the operation thereof by effecting a disconnection or fracture therein.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a clamp, a pair of hinged complemental clamping elements of light material defining a circular passage for receiving a pipe to be clamped therebetween, said elements having a length considerably greater than the diameter of said pipe, an outwardly projecting longitudinal flange on each of said elements, a circumferential rib integral with the exterior of each element and terminating in the flange for strengthening the elements longitudinally and transversely, a bolt on each side of the rib extending through the flange of each element for clamping said elements around the pipe, and an anchoring plate integrally formed at the end of one of the elements.

2. In a clamp, a pair of hinged complemental clamping elements of light material defining a circular passage for receiving a pipe to be clamped therebetween, said elements having a length considerably greater than the diameter of said pipe, an outwardly projecting longitudinal flange on each of said elements, a circumferential rib integral with the exterior of each element and terminating in the flange for strengthening the elements longitudinally and transversely, a bolt on each side of the rib extending through the flange of each element for clamping said elements around the pipe, an anchoring plate extending at an angle from the end of one of the elements, and a strengthening web between said plate and element, said plate, web and element being integrally formed.

In testimony whereof I have hereunto subscribed my name.

GEORGE G. FENHOUSE.